J. B. HUDDLE.
GAS GENERATOR.
APPLICATION FILED NOV. 9, 1914.

1,178,807.

Patented Apr. 11, 1916.
5 SHEETS—SHEET 1.

Attest:
Charles A. Becker
R. M. Lawrence

Inventor.
John B. Huddle,
by Rippey & Kingsland
His Attorneys.

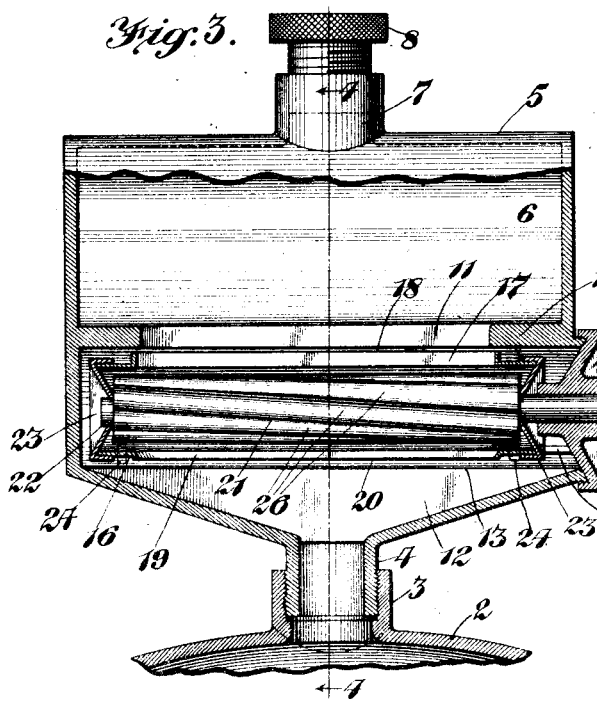
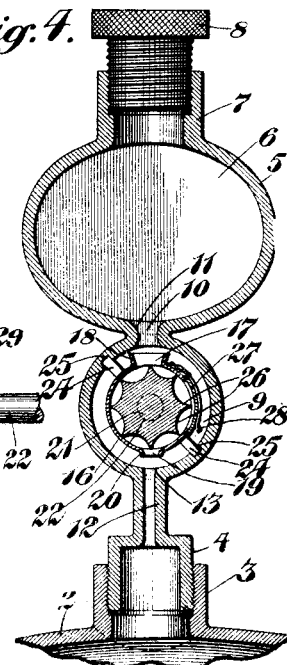
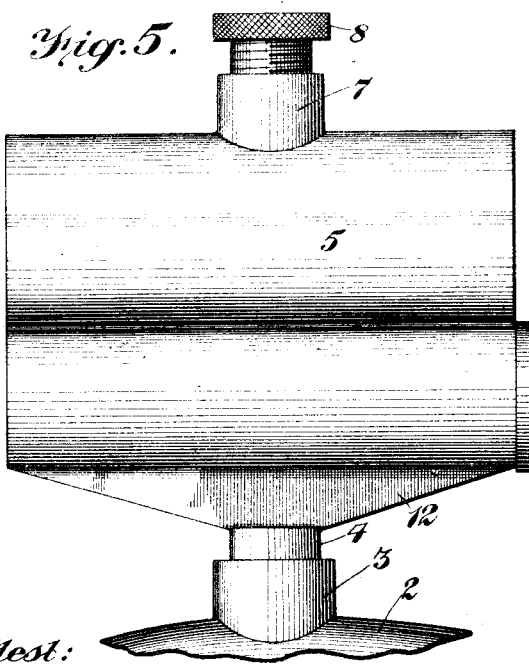
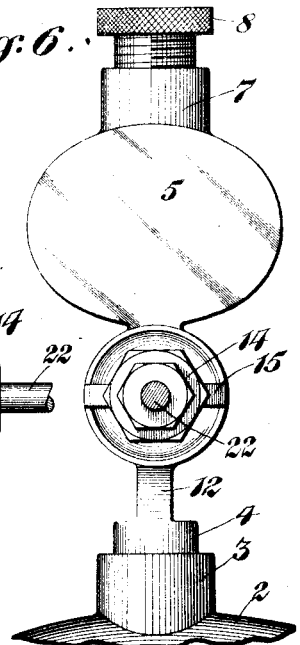

J. B. HUDDLE.
GAS GENERATOR.
APPLICATION FILED NOV. 9, 1914.
1,178,807.
Patented Apr. 11, 1916.
5 SHEETS—SHEET 3.
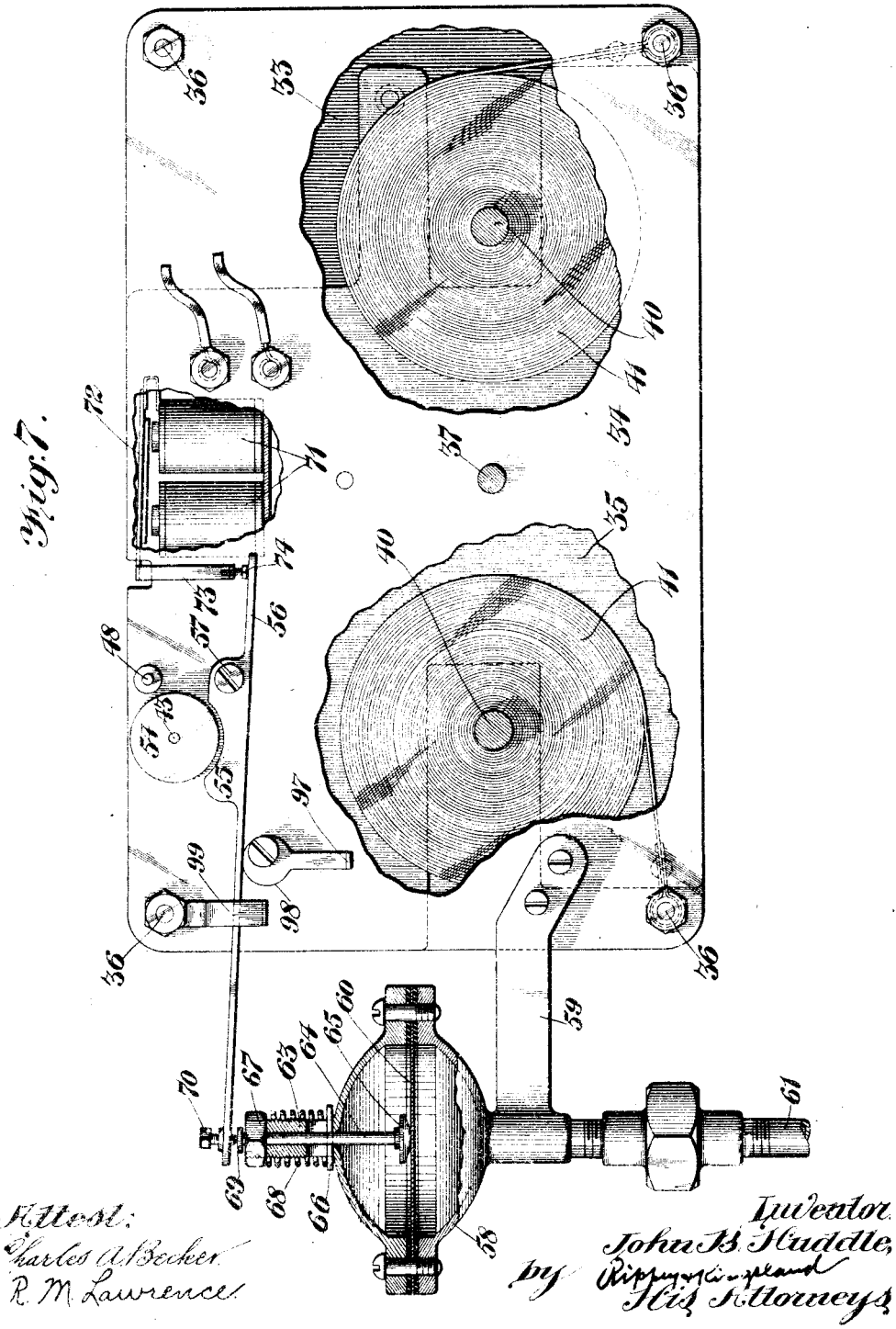

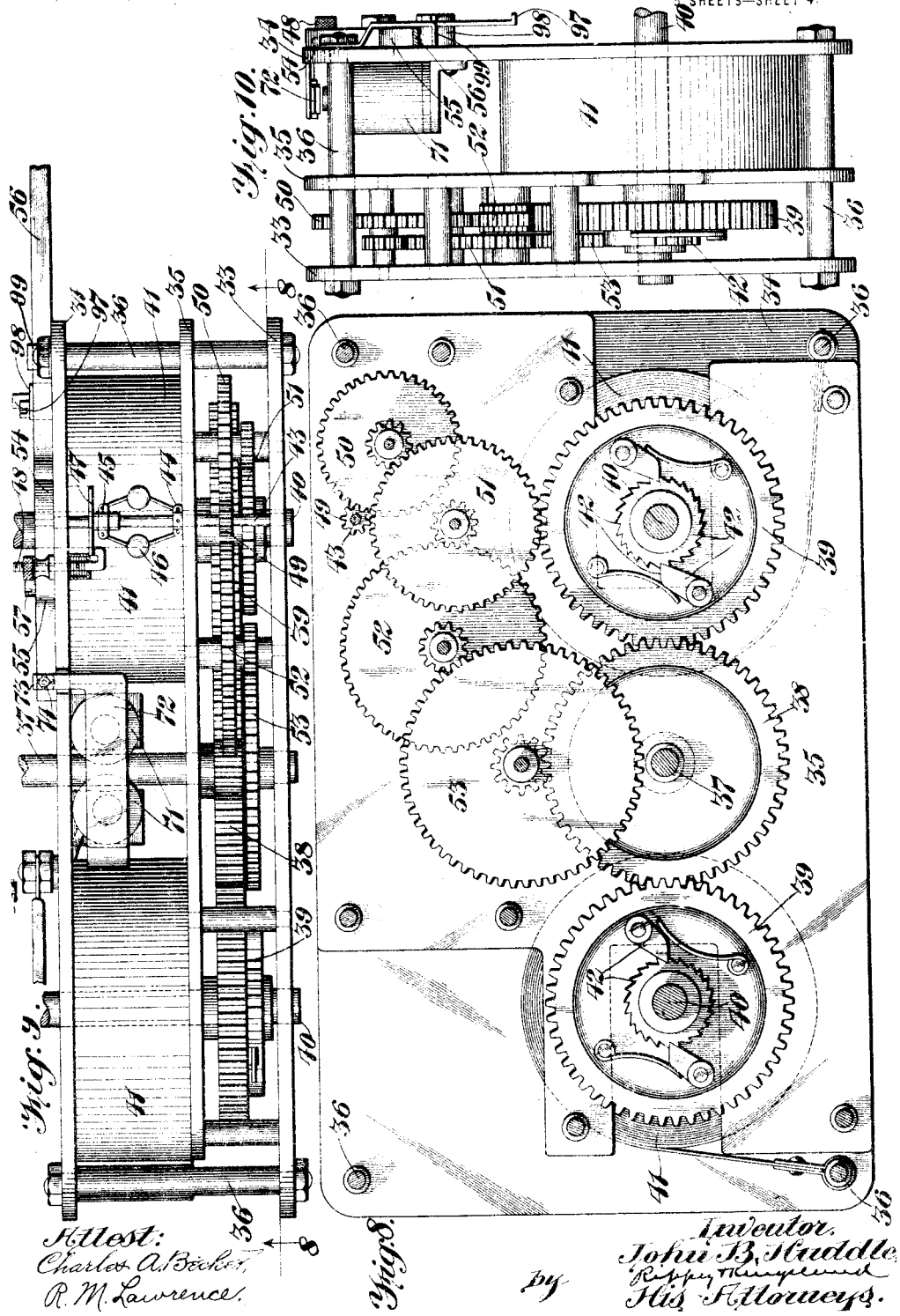

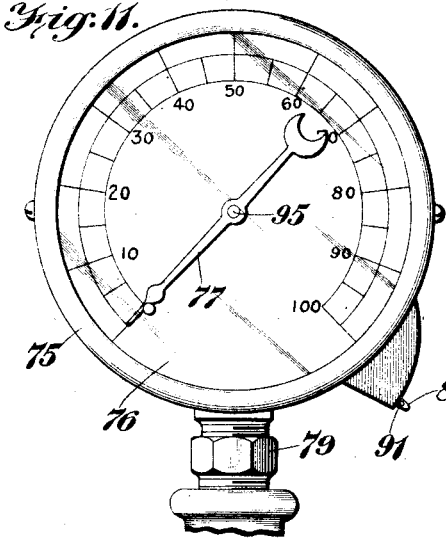
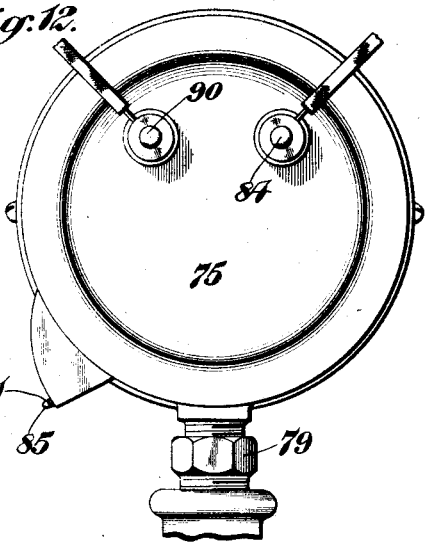
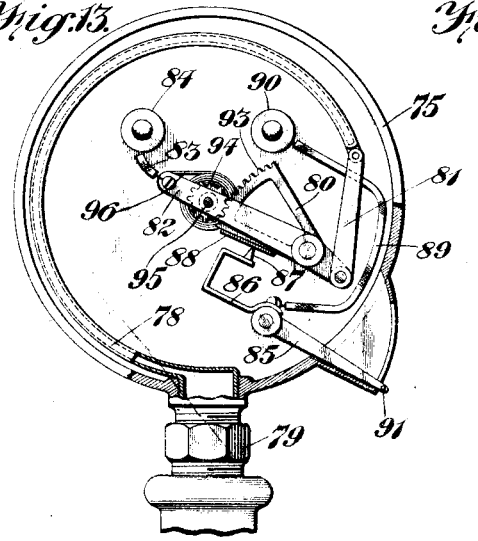
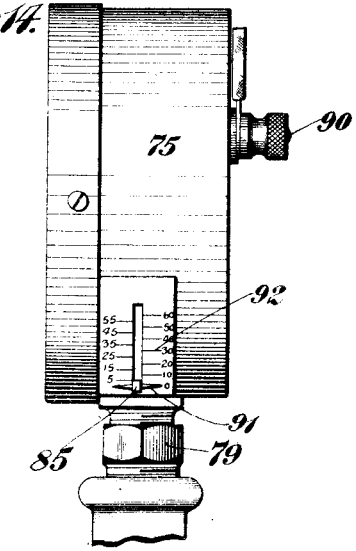

UNITED STATES PATENT OFFICE.

JOHN B. HUDDLE, OF EAST ST. LOUIS, ILLINOIS.

GAS-GENERATOR.

1,178,807.  Specification of Letters Patent.  Patented Apr. 11, 1916.

Application filed November 9, 1914. Serial No. 870,976.

*To all whom it may concern:*

Be it known that I, JOHN B. HUDDLE, a citizen of the United States, residing at the city of East St. Louis, county of St. Clair, and State of Illinois, have invented a new and useful Gas-Generator, of which the following is a specification.

This invention relates to gas generators, and more particularly to generators for generating gas by the mixture of a chemical with a liquid, such for instance, the generation of acetylene gas from water and calcium carbid.

An object of the invention is to equip a gas generator of the class mentioned with improved mechanism for feeding the chemical to the gas tank whereby the chemical received from a hopper is discharged in predetermined quantities into the tank.

Another object of the invention is to equip a gas generator of the class mentioned with an improved form of feeding mechanism, in combination with an improved driving mechanism therefor whereby the feeding mechanism may be driven at various predetermined speeds.

Another object of the invention is to equip a gas generator of the class mentioned with improved feeding mechanism and means for driving the feeding mechanism, in combination with automatically controlled devices actuated primarily by the gas pressure for controlling the operation of the mechanism for driving the feeding mechanism.

Another object is to generally increase the efficiency and safety of gas generators of the class mentioned whereby a predetermined gas pressure may be maintained in the gas tank to adapt the generator for use as an element of an oxy-acetylene welding plant and for an element in an illuminating plant or for other purposes, the amount of pressure being optionally determined to meet the requirements of various uses.

Other objects and advantages that are attained from the present invention will be apparent to those skilled in the art to which this invention appertains, without specific mention as they will be readily comprehended from the following detailed description of a preferred embodiment of the invention taken in connection with the accompanying drawings to which reference is made, and in which—

Figure 1:
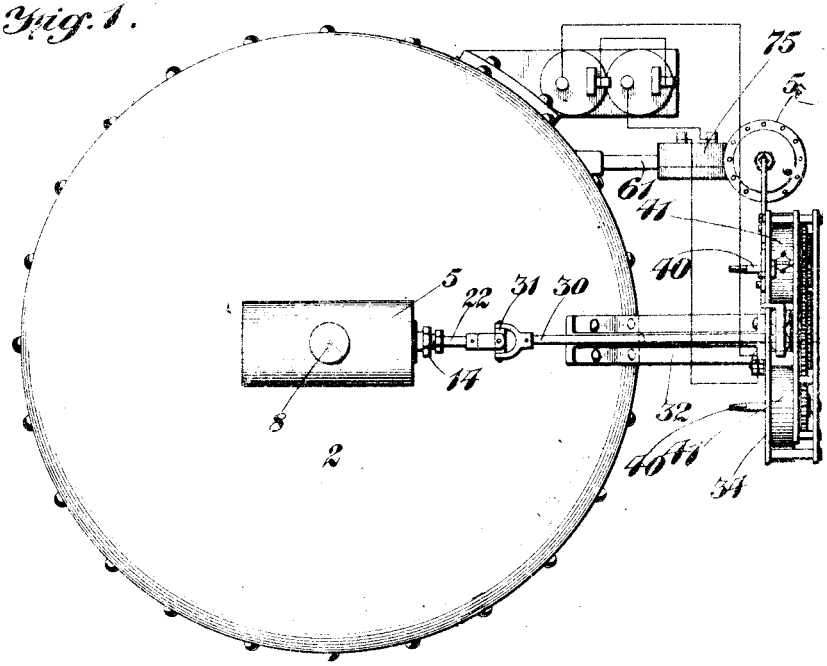
Figure 2:
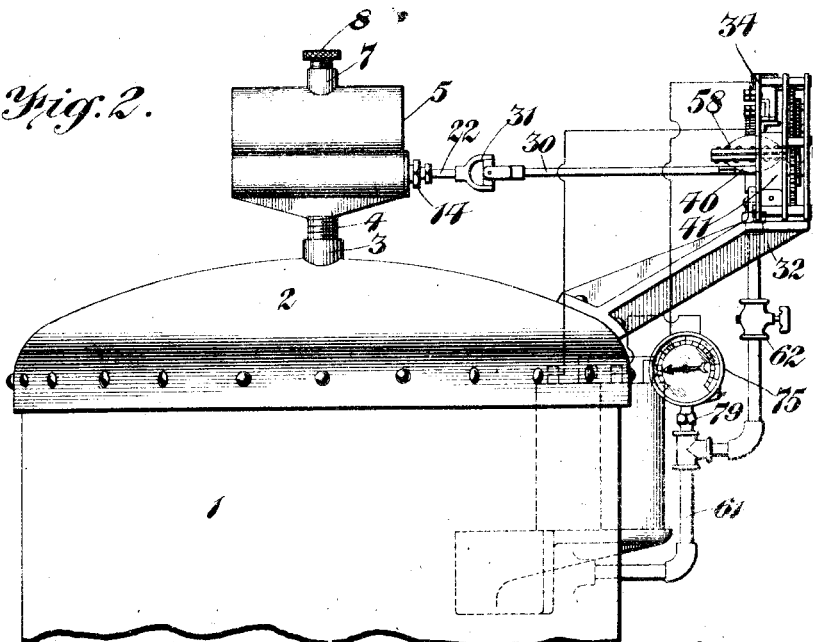

Figure 1 is a plan view of the assembled elements of the present invention. Fig. 2 is an elevation showing the parts in assembled relation. Fig. 3 is a view partially in section illustrating particularly the construction of the feeding mechanism illustrating this part of the invention in longitudinal section. Fig. 4 is a transverse section taken substantially on the line 4—4 of Fig. 3. Fig. 5 is a front elevation of the same mechanism. Fig. 6 is an end elevation thereof. Fig. 7 is a side view of the driving mechanism (portions being broken away to more fully disclose certain details of construction) associated with the devices for automatically controlling the operation of the driving mechanism. Fig. 8 is a view of the driving mechanism from the side opposite to that illustrated in Fig. 7 with the side plate removed to more fully disclose the construction of the device. Fig. 9 is a plan view of the driving mechanism. Fig. 10 is an end view thereof. Fig. 11 is a front face view of the electrically operated device under the control of the pressure in the tank whereby the operation of the driving mechanism is controlled. Fig. 12 is a rear face view of the device shown in Fig. 11. Fig. 13 is a view of the elements shown in Fig. 11 viewed from the same point but with the front face and indicating device removed therefrom, and Fig. 14 is a side view of the same device.

In the embodiment of the invention illustrated in the drawings the tank or container 1 is provided with a dome shaped head 2 having an interiorly threaded boss 3 adapted to receive a threaded extension 4 of a casing 5. The casing 5 is preferably of integral construction and comprises a substantially cylindrical chamber 6 having a threaded extension 7 which is closed by a screw plug 8. The screw plug 8 is readily removable so as to permit access to the interior of the chamber 6 for introducing the chemical utilized in the generation of the gas. Below the chamber 6 is arranged a second chamber 9, the chambers 8 and 9 being separated by a partition wall 10 which is provided with a longitudinal slot 11. Supported below the chamber 9 is a compartment 12 the walls of which incline toward the axis of the extension 4. The chamber 9 and the compartment 12 being in communication by means of a slot 13 co-axially arranged with respect to the slot 11. The walls of the chamber 9 are slightly extended at one side of the case, the extending portion being exteriorly threaded, and open at the outer end for the reception of the feed roll case and is adapted to be closed by the cap 14 which, for the purpose of convenience in screwing the same upon the threaded extension, is provided with a transverse rib 15 whereby the same may be engaged with a wrench or other suitable tightening device.

The feed roll case comprises a cylindrical shell 16 which is provided in its upper face with a longitudinal slot 17 adapted to register with the slot 11 in the partition wall 10. The slot 17 constituting a receiving opening is embraced by outwardly inclined walls 18 formed by the deflection of a portion of the case 16. The case 16 is further provided with a second slot 19 constituting a discharge opening and is embraced by outwardly deflected portions of the case 16 constituting walls 20. Within the feed roll case is rotatably mounted a roller or feeding drum 21 rigidly secured upon a shaft 22, said shaft being journaled at each side of the roller or drum 21 in caps 23 which have threaded engagement over each end of the case 16. It will be noted by reference to Fig. 3 that the walls of the caps 23 extend obliquely inwardly thus deflecting any of the chemical deposited thereon toward the ends of the roller or drum 21. The case 16 is prevented from rotating within the chamber 9 by means of lugs 24 projecting from the wall of the case 16 which seat in channels 25 formed in the inner wall of the chamber 9.

In the periphery of the roller or feeding drum 21 is formed a series of channels or recesses 26 extending from end to end of the roller or drum obliquely to the axis thereof. Thus it will be apparent that as the chemical passes from the chamber 6 through the slots 11 and 17 it will deposit successively in the channels or grooves 26 as the roller or drum is rotated, and will be discharged through the openings 19 and 13 into the compartment 12 from whence it will pass by gravity through the extension 4 and into the tank, the quantity of the chemical so fed being predetermined by the speed of rotation of the roller or drum 21. It is contemplated that the chemical shall be supplied to the chamber 6 in granulated form and that it will be comminuted sufficiently so that it will be received and discharged from the case 16 without obstructing the free rotation of the roller or drum 21. I provide, however, means for preventing the clogging of the chemical between the roller and the inner wall of the case by providing the case 16 with a hinged portion 27, which is normally retained closed by a spring 28. With this construction should a body of the chemical pass which is too large to be received between the walls of the case 16 and the bottom of one of the channels or grooves 26, the hinged portion 27 of the case will be pressed outwardly against the action of the spring and the obstructing body of the chemical will pass into the chamber 9 after which the hinged portion will move again into normal position by action of the spring.

The shaft 22 extends outwardly at one end through an opening in the cap 14 and through a stuffing gland 29. The shaft 22 is driven by a drive shaft 30 to which the shaft 22 is connected by a universal joint 31, permitting the shaft 30 to drive the shaft 22 from an angle if the requirements of the mounting necessitates such a disposal of the shaft 30 with respect to the shaft 22.

The drive shaft 30 is actuated by a motor of special design which is adapted to drive said shaft 30 at predetermined speeds and without vibration. The details of construction of the motor are clearly shown in Figs. 7 to 10, inclusive, of the drawings. The motor is preferably mounted upon a bracket 32 supported by the tank or container and comprises side plates 33 and 34 and a partition plate 35, the plates 33 and 34 being held in adjustment by stay rods 36 disposed transversely adjacent to each corner of said plates. Within and supported by the plates are the several operating parts of the motor. The main driving shaft of the motor 37 is disposed transversely of the plates 33 and 34 in which it is journaled and is located substantially in the center of the motor mechanism. Upon the shaft 37 is rigidly mounted a gear wheel 38 which is adapted to rotate in a vertical plane between the plate 33 and the partition plate 35. Master gear wheels 39 mounted upon revoluble shafts 40 are adapted to mesh with the gear wheel 38 and drive the same when the shafts 40 are rotated by the action of coil left springs 41, which have one end respectively secured to the adjacent lower tight rod 36 and the other end respectively secured to the shafts 40. The springs 41 being mounted between the plate 34 and the partition plate 35 are thus separated from the train of gearing included in the motor.

The gears 39 are loose on the shafts 40 and are adapted to be coöperatively locked therewith by a pawl and ratchet construction 42, so as to provide means for placing the springs under tension by the manual rotation of the shafts 40 by any suitable crank connection without operating the train of gears in a manner that will be well understood. The speed of rotation of the gear 37 is retarded and controlled by a governor shaft 43 upon which is mounted a governor device consisting of a collar 44 rigid on the shaft and a floating collar 45, the two collars being connected by weighted flexible arms 46. The collar 45 carries a disk 47 which is adapted to coöperate with an adjustable abutment member 48 mounted in the side plate 34. The shaft 43 is entrained with the gear 38 through a train of gearing comprising the pinion 49 and the gear and pinion elements 50, 51, 52 and 53. It will be apparent that this train of mechanism provides means for determining the speed of rotation of the gear 38 by which the shaft 37 is driven, and that by adjustment of the abutment element 48 the speed of the train of gearing may be predetermined. The gear and pinion elements 50, 51, 52 and 53 are each mounted on short shafts supported by the plates 33 and 35, thus providing a compact and non-vibrating train of gearing resulting in a uniform and steady drive of the shaft 37.

The shaft 43 extends through the plate 34 and carries thereon a disk 54 constituting a brake wheel which is adapted to coöperate with a brake shoe 55 formed integral with a lever 56, which is pivoted to the side plate 57 for controlling the shaft 43. It will be apparent that when the lever 56 is rocked on its pivot, and the brake shoe 55 is brought into contact with the periphery of the brake wheel 54 the shaft 43 will be locked against rotation. The mechanisms for operating the lever 56, therefore, constitute the automatic devices for controlling the operation of the motor by which the feeding mechanism is driven. I provide two mechanisms for this purpose both of which are primarily operated from the pressure in the tank for effecting the automatic control of the driving mechanism, one of the mechanisms, constituting a safety device or supplemental control when both are used and either of which may be utilized independently if desired.

I shall proceed to describe the mechanism, separately and then explain their use when jointly used for controlling the operation of the lever 56.

One of the devices for automatically controlling the operation of the lever 56 includes a case 58 which is supported to the motor frame by a bracket 59. A diaphragm 60 is supported within the case 58 dividing the case into two parts, the lower of which constitutes a pressure chamber which is in communication with the tank by means of piping 61, said piping being controlled by a valve 62. From the top of the case 58 a hollow boss 63 projects in which is mounted a vertically movable stem 64 to the inner end of which is attached a beveled head 65 normally resting upon the diaphragm 60. The stem 64 carries a pin 66 which projects through the boss 63 and between which and an adjustable nut 67 threaded over the exterior of the boss, an expansion spring 68 is interposed. The action of the spring 68 normally tends to depress the stem 64. The stem 64 projects beyond the boss 63 and is provided with a head piece 69 arranged adjacent to the under face of the outwardly extending arm of the lever 56. The lever 56 carries adjacent to its outer end an adjustable screw 70 whereby the relative operative relation between the stem 64 and the arm of the lever may be determined. The diaphragm 60 is designed to withstand certain predetermined pressures in the pipe 61 and will be elevated predetermined distances according to the degree of pressure upon the lower face of the diaphragm. When the pressure in the diaphragm case has reached the predetermined limit sufficient to move the extending arm of the lever 56 upward to a position to carry the brake shoe into contact with the brake wheel 54, the driving mechanism will be stopped in the manner heretofore explained.

The lever 56 is independently operated from its inner end by an electrical device comprising an electro-magnet 71 which actuates a spring armature bar 72, which has an integral arm 73 terminating adjacent to the upper face of the inner arm of the lever 56. The operative correlation of the arm 73 and the lever 56 may be adjusted by means of a thumb screw 74. When the electro-magnet 71 is energized the armature bar 72 will be drawn downwardly, the arm 73 coöperates to depress the inner end of the lever, thereby bringing the brake shoe 55 into contact with the brake wheel 54.

The mechanism for controlling the electro-magnet 71 is primarily actuated by the pressure in the tank by means of the device illustrated in Figs. 11 to 14, inclusive, of the drawing. This device comprises a case 75 in the front of which is mounted a dial 76 adapted to coöperate with an indicating device 77 for indicating visually the pressure in the tank. Within the case 75 is a flexible hollow arm 78, one end of which is sealed and the other end of which is connected into the piping 61 by means of a union connection 79. The sealed end of the flexible hollow arm 78 is operatively connected to a swinging segment 80 by means of a link 81 formed of insulating material. The segment 81 is supported in a frame 82 of conducting material said frame being secured within the case 75. One end of the circuit in which the electro-magnet 71 is located is electrically connected to the frame 81 and to the segment 80, by a lead 83 extending to a binding post 84 which constitutes also a binding post for the end of the circuit. A pivoted lever 85 is mounted in the case below the segment and carries a contact plate 86, which is provided with a contact point 87 extending adjacent to a contact plate 88 carried by the segment 80. The contact plate 86 is electrically connected to the other end of the circuit in which the electro-magnet 71 is located by means of a lead 89 connected thereto, which lead extends to a binding post 90 to which the end of the circuit is connected. The lever 85 extends outwardly through the case 75 and is provided with an indicator 91 which is adapted to coöperate with a scale 92 for adjusting the lever, so as to vary the relative distance between the point 87 and the plate 88 when the parts are in normal adjustment. It will be apparent that the extent of movement of the segment 80 will be directly coordinated with the amount of pressure admitted to the interior of the hollow arm 78. As the pressure within the hollow arm 78 increases, the sealed end thereof tends to move outwardly and thereby, through the link connection 81, moves the segment 80 toward the contact plate 86. The outer end of the segment 80 is provided with a rack 93 which coöperates with a pinion 94 fastening upon the shaft 95, which carries the indicating device 77. Thus, as the segment moves through an arc as the pressure increases the indicating device will be correspondingly moved upon the dial 76. The shaft 95, and, therefore, the indicating device 77 will be returned to normal position when the pressure is relieved by means of a coiled hair spring 96. From the above explanation of the controlling device it will be understood that when the segment is moved through a sufficient arc to bring the plate 88 in contact with the contact point 87, the circuit will be closed and the electro-magnet 71 energized, drawing the armature bar 72 downwardly and thereby through the connections above described actuating the lever 56 for setting the brake comprising the brake shoe 55 and the brake wheel 54.

The circuit for controlling the electro-magnet may be energized from any suitable source, either from dry cells or from a permanent source of supply. When energized from a permanent source of supply it is contemplated that the device just described may be used without the diaphragm device hereinbefore described, but it is contemplated that its chief use shall be that of a supplemental or auxiliary controlling device in the nature of a safety appliance. Thus, for instance, if the diaphragm device is adjusted to apply the brake at a predetermined pressure, say 15 pounds, the electrically controlled device may be set so as to operate upon a slightly excess pressure, so that in the event the diaphragm device should not co-act, for any reason, when the predetermined maximum pressure has been reached as determined by the electrical device, the brake mechanism will be operated. It is highly important where dangerous and explosive gases, such as acetylene gas, is being dealt with, that abundant precaution should be taken to prevent the pressure exceeding a safe maximum. It is for this reason that I contemplate the use of a double control for the power mechanism.

I have additionally provided a manual lock for the power mechanism which consists in a lever 97 having a cam 98, whereby the lever 56 may be moved to frictionally lock the brake shoe 55 in engagement with the brake wheel 54. I prefer to provide a guide plate 99 secured to the frame of the motor for retaining the forward arm of the lever 56 in proper alinement.

From the foregoing description the operation of my improved mechanism will be readily understood. It will also be understood that numerous details may be changed without departing from the spirit and scope of the invention. I do not desire to limit myself to exact details, therefore, but

What I claim and desire to secure by Letters Patent is:

1. A gas generator comprising a tank, a hopper having a cylindrical portion located exteriorly of said tank, a shell having a pivoted wall adapted to be removably mounted in said cylindrical portion of said hopper, a feeding drum mounted in said shell and adapted to advance the contents of the hopper in measured quantities to said tank, and power mechanism for driving said feeding drum.

2. A gas generator comprising a tank, a hopper located exteriorly of said tank and having a compartment for containing a chemical to be delivered to said tank and a cylindrical portion for receiving a feeding drum shell, a shell removably mounted in said cylindrical portion, a feed roller removably mounted in said shell and adapted to advance the chemical from the compartment containing the same to the tank in measured quantities, and power mechanism for driving said feed roller.

3. A gas generator, comprising a gas tank, a hopper located exteriorly of said tank, including a chemical supply chamber, a case integral with said supply chamber having a chute compartment in communication with said tank, a removable shell adapted to be interposed in said case, a feed roller provided with oblique channels rotatably mounted in said shell, registering passageways between said chemical supply chamber, said shell and said chute compartment, a drive shaft for said roller, and mechanism for driving said roller.

4. In a gas generator, the combination with a tank, of mechanism for feeding a chemical thereto, comprising a hopper located exteriorly of said tank provided with a slot through the bottom wall thereof, a feed roller shell adapted to be removably mounted below said hopper being provided with a slot in registration with the slot in the bottom wall of said hopper, caps having inwardly disposed walls for said shell and being provided with journaled bearings, a shaft journaled in said bearings, a feed roller provided with obliquely disposed channels in the periphery thereof supported on said shaft, outlet passages from said shell, a chute device arranged below said outlet passages and means for driving said feed roller shaft, substantially as specified.

5. In a gas generator, a hopper, a tank located below said hopper, a feed mechanism adapted to advance measured quantities of material from said hopper to said tank, a power device for driving said feed roller, a brake for locking said power device, a pressure passage leading from said tank, a diaphragm in said passage, a stem actuated by said diaphragm, an adjustable connection between the brake mechanism and said stem, and independent means for locking said brake mechanism.

6. In a gas generator, the combination with a gas tank, mechanism adapted to feed a chemical to said tank and power mechanism for driving said feeding mechanism, of a pressure operated device for locking said power mechanism against operation, and a supplemental electrically-controlled mechanism under the influence of the pressure in said tank for operating the device for locking said power mechanism.

7. In a gas generator, the combination of a gas tank, mechanism adapted to feed a chemical to said tank and power mechanism for driving said feed mechanism, of a brake device for said power mechanism, a diaphragm motor under the influence of the pressure in said tank for operating said brake device, and a supplemental electrically controlled actuating mechanism for said brake also under the control of the pressure in said tank, substantially as specified.

8. In a gas generator the combination with a gas tank, mechanism for feeding a chemical to said tank and power mechanism for driving said feeding mechanism, a brake device associated with said power mechanism and means for actuating said brake device comprising an electrically operated arm, a circuit for operating said arm and a circuit breaker in said circuit under the direct control of the pressure in said tank adapted to close said circuit when predetermined pressures have been attained in said tank.

9. A gas generator, comprising a gas tank, mechanism for feeding a chemical thereto and power mechanism, of a brake device associated with said power mechanism, electrical means for actuating said brake device comprising an electro-magnet, an armature bar operatively connected to said brake device, a circuit for energizing said electro-magnet, a circuit breaker equipped with optionally adjustable means for predetermining the operation of said device for closing the circuit coördinately with varying degrees of pressure in said tank, substantially as specified.

10. A gas generator, comprising a tank, a hopper located exteriorly of said tank, a feeding mechanism associated with the hopper and adapted to deliver measured quantities of chemical from said hopper to said tank, a shaft for operating said feeding mechanism, a power mechanism for driving said shaft, a brake device for said power mechanism, a pressure passage leading from said tank, a diaphragm in said pressure passage, a movable element actuated by said diaphragm and associated with said brake device adapted to set said brake device when a predetermined pressure has been attained in said pressure passage, and an electrically-controlled and optionally settable mechanism associated with said brake device for setting the same when a predetermined pressure has been attained in said tank, substantially as specified.

11. A gas generator, comprising a tank, a feeding device comprising a hopper, a cylindrical portion located below the hopper and a chute device below said cylindrical portion, there being passage ways between said hopper, cylindrical portion and said chute, said parts being formed integrally and located exteriorly of the tank, a shell having a pivoted wall adapted to be mounted in said cylindrical portion, a cap for one end of said cylindrical portion, and a feed roller journaled at one end in said shell and having an extending shaft journaled in said removable cap, and power mechanism operatively connected with said shaft.

12. In a gas generator, the combination with a gas tank, feeding mechanism for feeding a chemical to said tank and power mechanism for driving said feeding mechanism, of a brake device for said power mechanism, a diaphragm operatively connected with said brake device, means for adjusting said diaphragm to withstand pressure of varying degrees, a pressure passage from said tank associated with said diaphragm, an independent device for controlling said brake including an armature, an electric current in circuit with said armature, a switch in said armature, a pressure passage from said tank associated with said switch, and an optionally adjustable device for coordinating the operation of said switch relative to predetermined pressures in said tank, substantially as specified.

In witness whereof, I have signed this specification in the presence of two subscribing witnesses.

JOHN B. HUDDLE.

Witnesses:
L. C. KINGSLAND,
R. M. LAWRENCE.